United States Patent
Barnick

(10) Patent No.: US 6,943,919 B1
(45) Date of Patent: Sep. 13, 2005

(54) METHOD AND APPARATUS FOR CORRECTING DEFECTS IN A SPATIAL LIGHT MODULATOR BASED PRINTING SYSTEM

(75) Inventor: William M. Barnick, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 1074 days.

(21) Appl. No.: 09/606,891

(22) Filed: Jun. 29, 2000

(51) Int. Cl.[7] .............................................. G06K 15/00
(52) U.S. Cl. ..................... 358/3.26; 358/406; 358/504; 347/232; 347/237
(58) Field of Search ................. 358/1, 9, 3.26, 358/406, 504, 302; 347/236, 237, 238, 239, 347/246, 247, 232, 255

(56) References Cited

U.S. PATENT DOCUMENTS

| | | | |
|---|---|---|---|
| 4,728,965 A | 3/1988 | Kessler et al. | |
| 5,061,049 A | 10/1991 | Hornbeck | |
| 5,081,523 A * | 1/1992 | Frazier | 348/178 |
| 5,521,748 A | 5/1996 | Sarraf | |
| 5,652,661 A | 7/1997 | Gallipeau et al. | |
| 5,701,185 A | 12/1997 | Reiss et al. | |
| 5,745,156 A | 4/1998 | Federico et al. | |
| 5,793,221 A * | 8/1998 | Aoki | 324/770 |
| 6,496,176 B1 * | 12/2002 | Kondoh et al. | 345/101 |

FOREIGN PATENT DOCUMENTS

| | | | | |
|---|---|---|---|---|
| JP | 04244929 A | * | 9/1992 | G01M 11/00 |
| JP | 04244932 A | * | 9/1992 | G01M 11/00 |

* cited by examiner

*Primary Examiner*—Scott A. Rogers
(74) *Attorney, Agent, or Firm*—Nelson Adrian Blish

(57) ABSTRACT

A method for correcting defects (300) in an imaging system (10) that comprises several steps. Transmitting a digital image (370) to at least one spatial light modulator and capturing the resulting image. Comparing variation in intensity between each image pixel and at least one reference image pixel and deriving a correction factor (305) from the comparison. Determining gain of correction (480) at each code value (460) for each image pixel and applying the correction factor (580) and gain to the digital image (510).

34 Claims, 9 Drawing Sheets

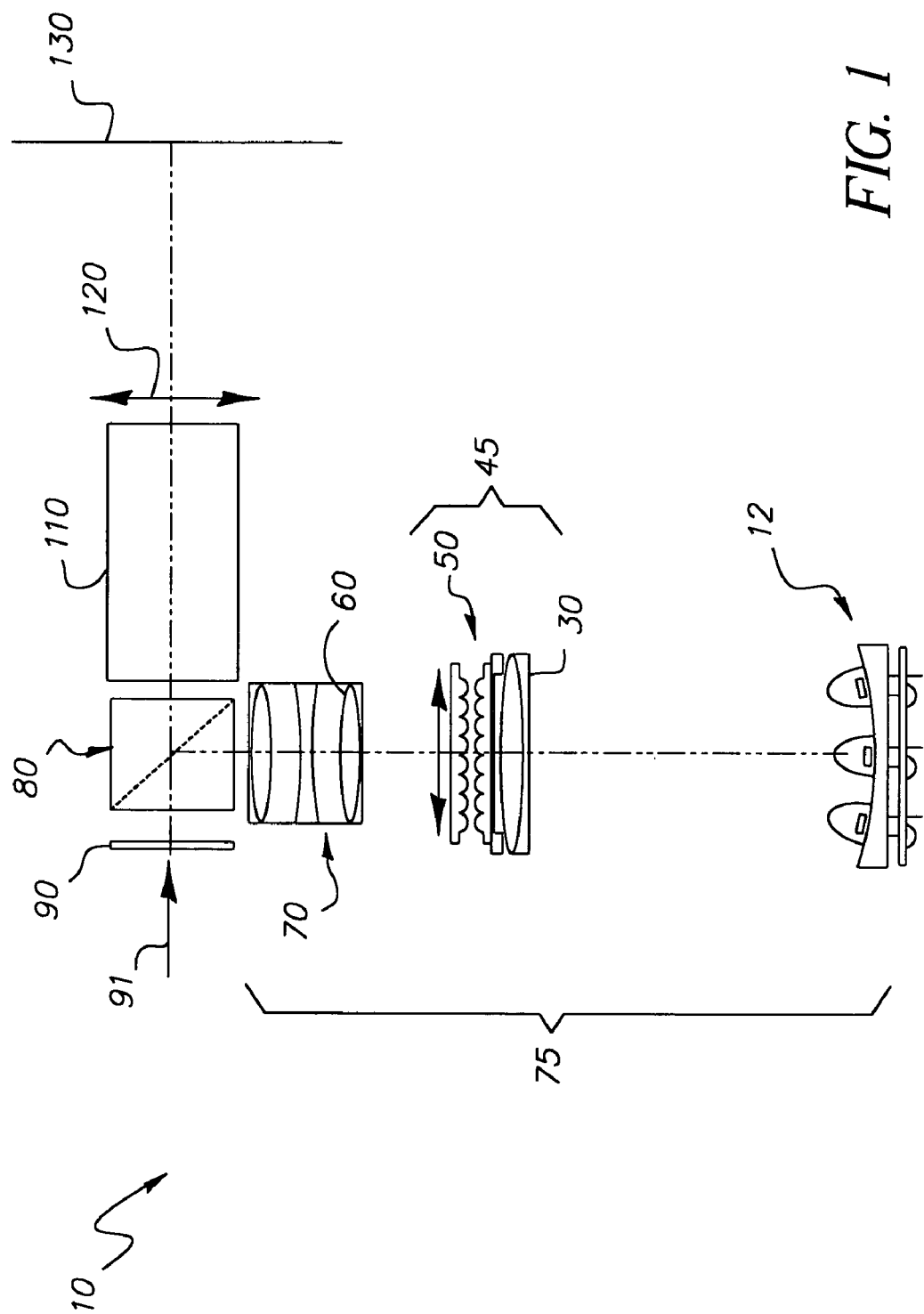

METHOD AND APPARATUS FOR CORRECTING DEFECTS IN A SPATIAL LIGHT MODULATOR BASED PRINTING SYSTEM

FIELD OF THE INVENTION

This invention relates in general to a method for correcting defects in an image, an in particular to correcting non-uniformity errors that are the result of projecting onto photosensitive media from a two dimensional projection device such as a spatial light modulator device.

BACKGROUND OF THE INVENTION

Photographic images are traditionally printed on photographic paper using conventional film based optical printers. The photographic industry, however, is converting to digital imaging. The process uses images obtained from digital cameras, or scanned film exposed in traditional photographic cameras, to create digital image files that are then printed onto photographic paper.

The growth of the digital printing industry has led to multiple approaches to digital printing. One of the early methods used for digital printing was cathode ray tube (CRT) based printers such as the Centronics CRT recorder. Another commonly used approach to digital printing is the laser based engine shown in U.S. Pat. No. 4,728,965. Such systems are generally polygon flying spot systems which use red, green, and blue lasers.

A more contemporary approach uses a single spatial light modulator such as a Texas Instruments digital micromirror device (DMD) as shown in U.S. Pat. No. 5,061,049. Spatial light modulators provide significant advantages in cost as well as allowing longer exposure times, and have been proposed for a variety of different printing systems from line printing systems such as the printer depicted in U.S. Pat. No. 5,521,748, to area printing systems such as the system described in U.S. Pat. No. 5,652,661.

Another low cost solution uses LCD modulators. Several photographic printers using commonly available LCD technology are described in U.S. Pat. Nos. 5,652,661, 5,701,185, and 5,745,156. Most of these designs involve the use of a transmissive LCD modulator such as is depicted in U.S. Pat. Nos. 5,652,661 and 5,701,185.

A problem with all of these devices is that they occasionally produced defects in the final image. These defects may be due to, for example, surface finishing of the LCD which results in a high spatial frequency defects. Another defect, again using the LCD as an example, is low spatial frequency defects in the resulting image caused by warping of the plate as it is attached to the LCD during manufacture.

It is the purpose of this invention to correct image defects in an area spatial light modulator based printing system.

SUMMARY OF THE INVENTION

It is an object of the present invention to provide a method and apparatus for correcting non-uniformity in an AgX printed image projected from an area array device such as a LCD reflective array. The present invention is directed to overcoming one or more of the problems set forth in the background of the invention.

Briefly summarized according to one aspect of the present invention, a method for correcting defects in an imaging system comprises the steps of transmitting a digital image to at least one spatial light modulator and capturing a resulting image; comparing variations in intensity between each image pixel and at least one reference image pixel; deriving a correction factor from the comparison; determining gain of correction at each code value for each image pixel; and applying the correction factor and gain to the digital image.

The present invention takes the printed results of an area array device, and uses this non-uniform image as the basis for correcting the data path. This may be done by digitally scanning the printed image to receive a pixel-by-pixel digital version of the non-uniform characteristics. The method of acquiring image data may have a different response curve to the data there is, also a singular gain value that is applied to the scanned image making it a correction map for non-uniformity at a singular exposure code value. Consequently, the invention works across all code values from the area array device. The amount of corrections is weighted by utilizing information from the measured response at the image plane.

In a second major embodiment the amount of corrections is weighted by utilizing the general response curve of the device. In a third major embodiment a predetermined uniformity map is provided. In a fourth embodiment, multiple defect correction maps are generated. In a fifth embodiment a three dimensional look up table is generated.

The above and other objects, advantages, and novel features of the present invention will become more apparent from the accompanying description thereof when considered in conjunction with the following drawings.

BRIEF DESCRIPTION OF THE DRAWINGS

FIG. 1 is a schematic view of a reflective LCD modulator system for printing two-dimensional swaths.

DETAILED DESCRIPTION OF THE INVENTION

Figure 2A:
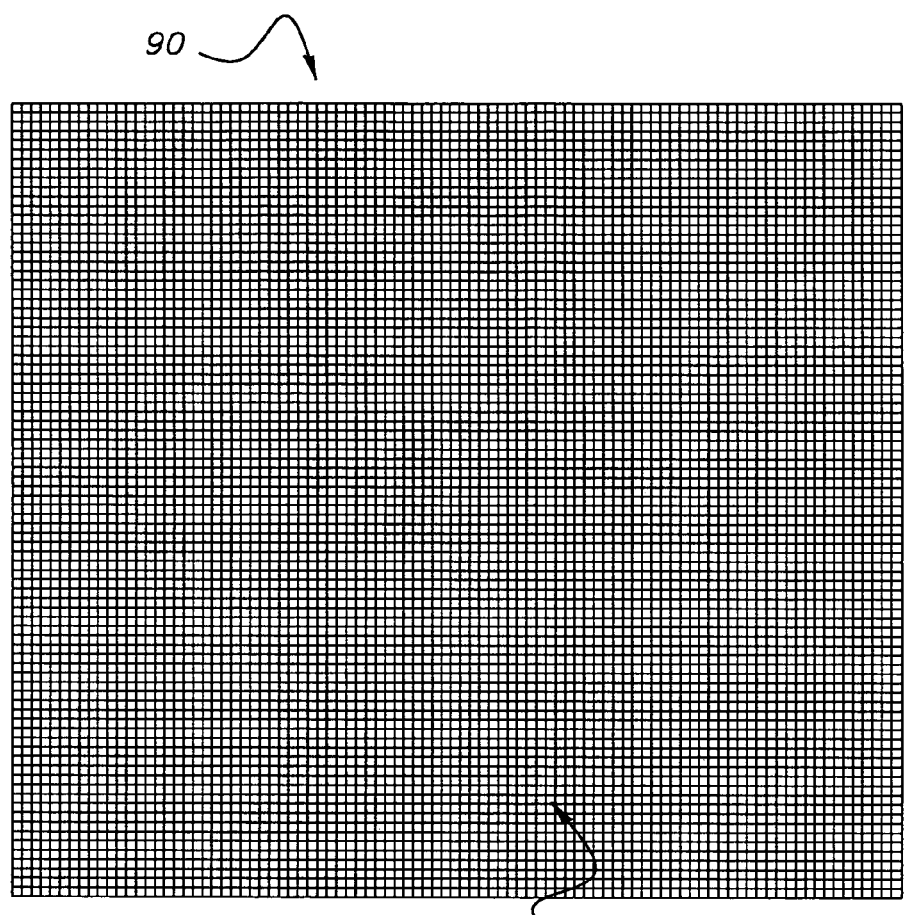
FIGS. 2a and 2b are a top plan view and a side view in cross section, respectively, of a reflective LCD modulator.

The present description will be directed in particular to elements forming part of, or in cooperation more directly with, an apparatus in accordance with the present invention. It is understood that the elements not shown specifically or described may take various forms well known to those skilled in the art.

Referring to FIG. 1, there is illustrated a printer referred to in general by numeral 10. The photographic printer is comprised of a light emitting diode (LED) 12, uniformizing optics 45, polarizing beamsplitter 80 reflective LCD modulator 90, a data path (not shown) for providing image information to the reflective LCD modulator 90, and a print lens assembly 110. The photographic printing system 10 provides a two-dimensional image on light sensitive media 140 located at an image plane 130.

The LEDs are arranged in a two-dimensional array. Each of the LEDs emits one of three distinct wavelengths, red, blue, or green. The LEDs are typically mounted in a circular aperture and are arranged such that the colors of emission are spread evenly about the aperture. The LEDs are spaced such that a significant fraction of the light emitted can be captured in the collection aperture of the illumination optics 75. Furthermore, redundancy in emitters reduces the system sensitivity to malfunction in any individual LED.

The LEDs are operated in a pulsed and color sequential manner. For any given image, groups of LEDs are activated in order of wavelength. For example, the red LEDs are activated and deactivated, the blue LEDs are activated and deactivated, then the green LEDs are activated and deactivated. Following each LED the system may include a collimating lens 14, or alternatively a Fresnel lens.

Each of the LEDs is mapped by the illumination optics 75 to cover the area of the reflective LCD modulator 90 in a uniform and essentially telecentric manner at the modulator plane. The illumination optics 75 is designed to illuminate a nearly square or rectangular aperture. In general, axially symmetric components are employed in the illumination. Following the LEDs are uniformizing optics 45 comprising a field lens 30 that images light to a lenslet array 50 and field lens 60. The light at the intermediate conjugate plane 65 is broken into a number of portions equivalent to the number of elements in the first portion of lenslet array 50. The individual portions are then superimposed and magnified by the second portion of lenslet array 50 and the field lens 60. A condenser lens 70 is positioned immediately before the polarizing beamsplitter 80. In a single reflective LCD modulator imaging system a linear polarizer 40 may be incorporated in the illumination optics 75 prior to the polarizing beamsplitter 80.

Figure 2B:
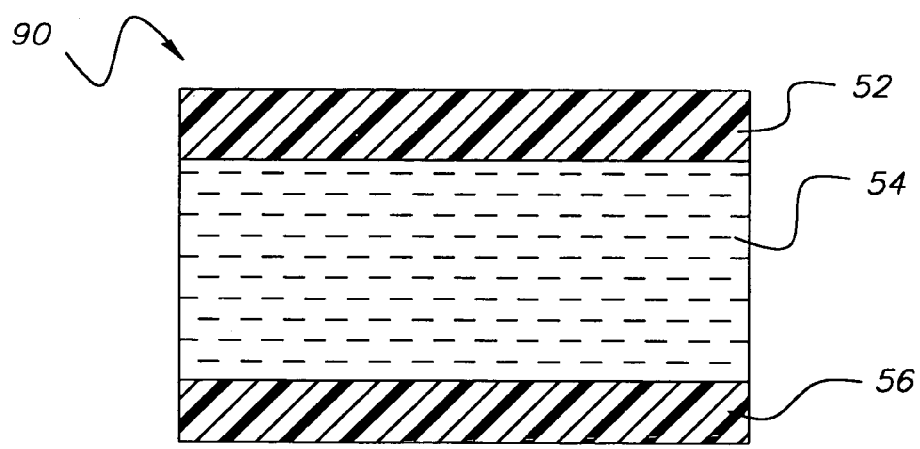

FIGS. 2a and 2b show a top view and a side view of a reflective LCD modulator. The reflective LCD modulator 90 consists of a plurality of modulator sites 92 that are individually modulatable. Light passes through the top surface of LCD 52, liquid crystal material 54, of reflective LCD modulator 90, is reflected off the back plane of LCD 56 of the modulator, and returns through the modulator. If a modulator site 92 is "on" or bright, during the round-trip through the reflective LDC modulator 90, the polarization state of the light is rotated. In an ideal case the polarization state of the light is rotated 90 degrees. However, this degree of rotation is rarely easily achieved. If a given modulator site is "off" or dark, the polarization state of the light is not rotated. The light that is not modulated is not passed straight through the polarized beamsplitter 80 but is redirected away from the light sensitive media 140 plane by the polarized beamsplitter 80.

Referring again to FIG. 1 the reflective LCD modulator 90 and the polarized beamsplitter 80 are followed by print lens assembly 110 and a linear polarizer 120. This lens assembly provides the correct magnification of the image of the reflective LCD modulator 90 to the image plane 150 where the media light sensitive media 140 is located. The print lens assembly 110 is designed to provide magnification relating to a given image size at the media plane. Once imaged at the media plane, the printer moves the media to a next position and the next image is recorded. In any system on any media on which images are created at multiple wavelengths, the composite tri-color image will be referred to as an image.

The most readily available choice of reflective polarization based modulators is the reflective liquid crystal modulator. Such modulators, originally developed for use in projection display, can have resolutions as high as 4000×2000 modulator sites. However, most commercially available spatial light modulators display a number of non-uniformities including roll-off and site defects.

The reflective LCD modulator 90 can be designed in a number of different configurations. The most amenable to a low cost printing system is a single chip system used in color sequential mode. Such a LCD may be either specifically designed for color sequential use, often incorporating a faster backplane and slightly different liquid crystal compositions, or can be a single chip with a 60 to 70 frame per second backplane. The latter option is sufficient for printing because the high frame rates are not a necessity and often reduce the bit depth of the resulting image. However, while many liquid crystals are the same basic crystal for all three primary color wavelengths, sometimes, either due to the specific applied voltage or the liquid crystal thickness, operation may differ in the three wavelengths. Specifically, for a given liquid crystal composition, depth, and applied voltage, the resulting polarization rotation on an incident beam may vary with wavelength. The efficiency and contrast of the modulation will vary among the three colors. This optical system is designed to image and pass light with a rotated polarization state. However, the degree of rotation will vary as a function of wavelength. In the bright, or "on" state, this difference in rotation will affect the efficiency of the system. In other words, the percentage of incident light that is actually modulated and imaged on the media plane will vary. This difference in wavelength efficiency can be accounted for by varying the illumination strength, and exposure time. Also, the media requires different power densities in the different wavelengths. More significant problems arise in the dark or "off state". In this state, the polarization state of the light is not rotated and should not be directed thought the polarizing beamsplitter 80 and imaged. If the polarization state of the light is in fact rotated, light will leak through the imaging system and decrease the contrast.

Most spatial light modulators are designed for use in projection systems. The eight bit (or greater), sequence of code values, or integer values corresponding to color levels, may not readily translate into the correct sequence of color intensity for the given application or on print media. The code values themselves are determined by the voltage and addressing of the modulator, and form a monotonically increasing sequence of intensity. Media also has a responsivity that alters the appearance of an image. For instance, the intensity corresponding to a bright red image may translate to a more muted cyan image on photosensitive media. The optical system and modulator are tuned or calibrated such that a known sequence of code values in combination with preset illumination conditions, determine known density values on media. This method of determining operating conditions pertaining to color content is called color calibration.

Having calibrated the system such that known intensity values are projected, and known density values are printed, information pertaining to spatial uniformity of resultant images can be determined. Spatial nonuniformities can be divided into two categories, low spatial frequency and high spatial frequency.

Low frequency non-uniformities refer to undesirable changes in image intensity at the image or media plane that are coarse or change gradually. A good example of such nonuniformity is roll-off at the edge of an image. Correcting low frequency nonuniformity does not require adjusting data on an image pixel basis. Consequently, the requirements on pixel alignment accuracy are not so stringent.

For such low frequency correction a uniform image of a single code value is transmitted to the array device. A single value sent to all the array elements is know as a flat field. In turn, the device exposes photosensitive media 200. In this situation the media is photographic paper. The processed photographic paper clearly shows the areas of non-uniformity.

Figure 3:
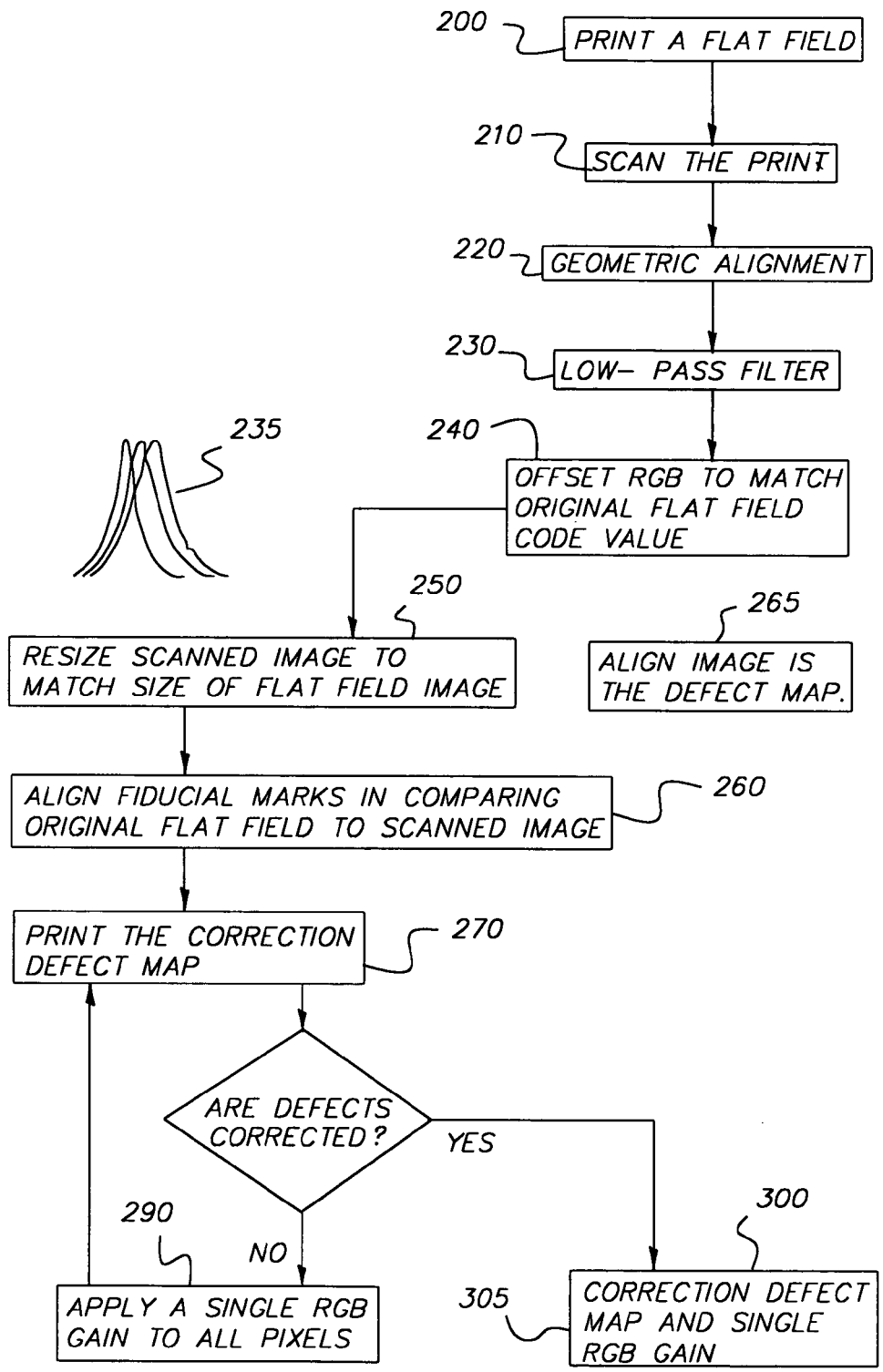
FIG. 3 is a flow diagram of a single gain value for a single code value for a scanner.

Referring to FIG. 3 the next step is to scan the printed flat field with a flat bed reflection scanner 210. The scanned image has to then be prepared to correct for unique geometric alignment issue 220. Then the image is low-pass filtered 230 to correct for low spatial frequency non-uniformity. Finally the scanned image is color balanced by a simple offset alignment of the histogram curves 235 for the three individual color channels (RGB) 240. The image is then resized to match the size of the flat field image 250. Fiducial marks, or dust spots, are used to align the original flat field image to the scanned image 260. At this point the system has a defect map 265. Next an image including offsets determined by the defect map is printed 270. If the defects are corrected 300 the defect correction map 305 is ready for the next step. If the defects are not corrected 290, algorithm returns to step 270, printing the defect map. The reflection scanning method is a lower cost solution, but has advantages for removal of low spatial frequency non-uniformity.

High frequency nonuniformities refer to undesirable changes in the image intensity that are noticeable at the pixel level. Such defects require detailed knowledge of each image pixel. For such cases, reflection scanners do not provide adequate resolution or geometric alignment. The "defect map," or knowledge of the image, is generated with sub pixel accuracy. In other words, each image pixel is oversampled. This data or map can be acquired with a high-resolution CCD camera or some other equivalent image acquisition system. Whichever method is chosen, a pixel level map of image data is created and stored.

Figure 4:
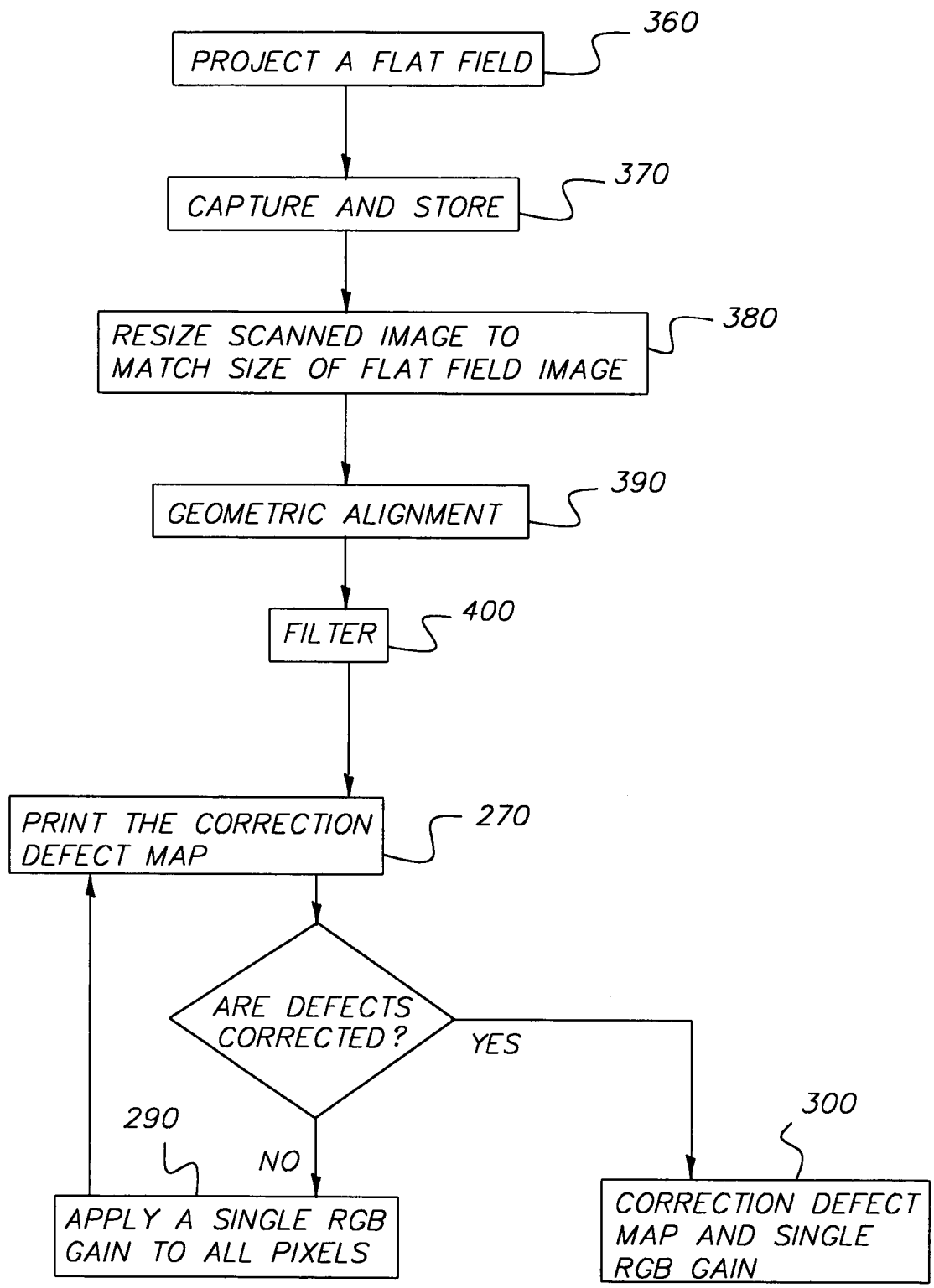
FIG. 4 is a flow diagram of a single gain value for a single code value for a CCD.

For high frequency correction, the algorithm of acquisition is shown in FIG. 4 as a flow chart. The first step is to project the flat field image 360 onto a CCD camera to capture the projected image digitally 370. The digital image has to then be resized 380 and prepared to correct for unique geometric alignment issue 390. Then the image is high-pass filtered 400 to correct for high spatial frequency non-uniformity. At this point the system has a defect map 265. Next an image including offsets determined by the defect map is printed 270, the defects are corrected 300 the defect correction map 305 is ready for the next step. If the defects are not corrected 290, a single RGB gain is applied to all pixels, and the algorithm returns to step 270, printing the defect map.

In the first embodiment the color corrected, filtered, and aligned image becomes the defect map. Care should be taken in examining the data from the defect map. When a scanner is used, the data is inverted. When a CCD camera is used, the data is not inverted. In some cases, a map may be provided with the system.

The defect map is a pixel by pixel mapping of the spatial variations in image intensity at a given code value, or for a flat field. The code value corresponds to a mid density point in a printed image which demonstrates the image non-uniformity. If the chosen code value is the "worst case" for image artifacts, it will require the most correction. All other code values will requires a fraction or percentage of the maximum correction required at the mid density point. Since it is preferable to working normalized space, it is most convenient if the code value at which the defect map is created is the worst case. Within the flatfield image, with reference to a center image pixel or otherwise declared reference image pixels, relative variations in image pixel intensity can be quantified. Every image pixel within the flat field image is approximately an integer number of code values different from the reference pixel. This difference is the offset. By adjusting the input image data for each pixel at the image plane by the offset from the reference pixel, the projected image data appears uniform at the specified code value.

The input image data is most easily adjusted at the spatial light modulator by adjusting either data fed to the spatial light modulator on a site by site basis, or by adjusting the operating conditions such as the amplifier threshold at the spatial light modulator. The image data including the pixel variations serves as the "defect correction map."

Since the array device and the flat bed scanner each have there own gain levels (i.e. gamma curve) there is also an issue of knowing how much correction to apply. Therefore the correction data is also adjusted by a gain value prior to applying it to the image data for projection. This gain value can be quickly determined by doing a series of exposures with different gain values applied.

At this point there is sufficient data to correct for defects from an area array device at a single code value. To be able to correct an image that contains a wide tonal range would require considering the effects at multiple code values. If the defect correction map was generated at the worst uniformity case, the gain for any other code value at any pixel can be approximated as a percentage of the gain applied at the code value at which the defect correction map was generated.

Figure 5:
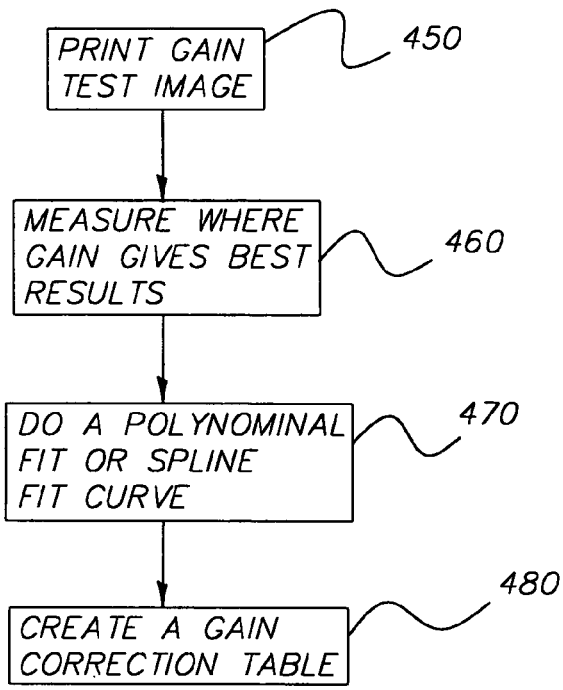
FIG. 5 is a flow diagram for creation of a gain correction table.
Figure 6:
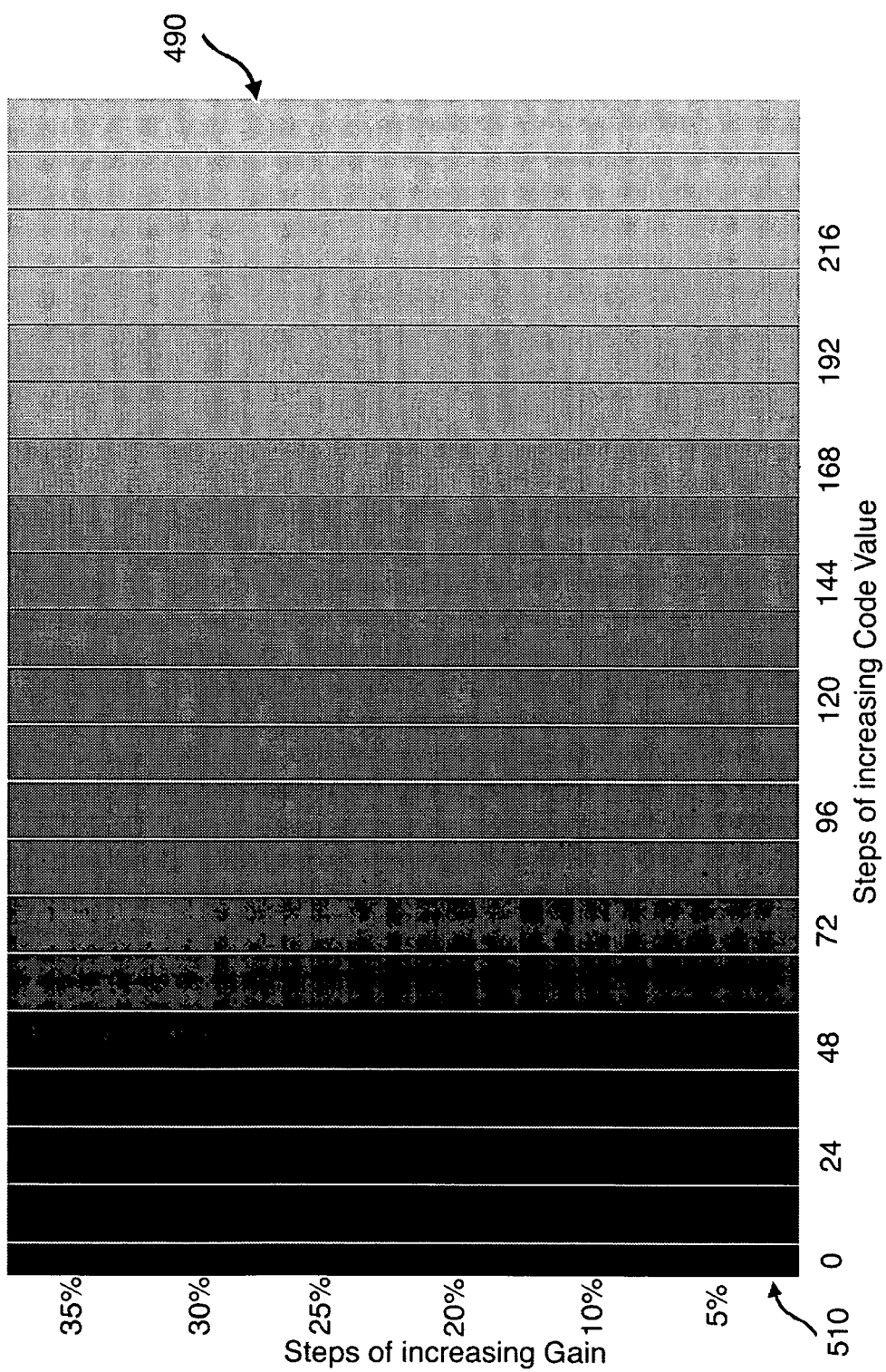
FIG. 6 is a gain curve test image.

In a preferred embodiment, a gain response curve is needed for the corrections to work across all the code values. The method used to obtain this gain response curve, depicted in the flow chart of FIG. 5, is to print an image 450 in which the code value is varied from the lowest to highest densities in one dimension in stepped increments. The result is an image that looks like stripes of increasing density 490 as in shown in FIG. 6. In the other dimension, the gain is incremented in predetermined steps 510. In printing this test image the observer can subjectively decide the best gain value for a given code value 460. The determination can also be made by measuring for the lowest standard deviation within a particular code value strip. Alternatively, the intensity distribution at a prescribed code value can be Fourier transformed and the spatial frequency components examined. The gain value that corresponds to minimizing the spatial frequency components corresponding to any pattern noise is the best choice at a given code value.

The chosen gain value may be constant or vary from code value to code value linearly or other wise. The algorithm may be implemented by determining a gain for every code value, but this is tedious. It is preferable to use a smaller number of code values and assume reasonable continuity in the gain profile between consequent code values. Once all the gain values are gathered a spline curve-fitting algorithm is used to give us a continuous response curve over the entire density range 470.

The continuous response curve serves as a gain correction table 480 in combination with the defect correction map provides correction data for every image pixel at every code value. This data is applied to the optical system via image data at the point at which pixilated image data is applied. In the case of a spatial light modulator based printing system, the information is carried in the image data sent to the spatial light modulator.

Figure 7:
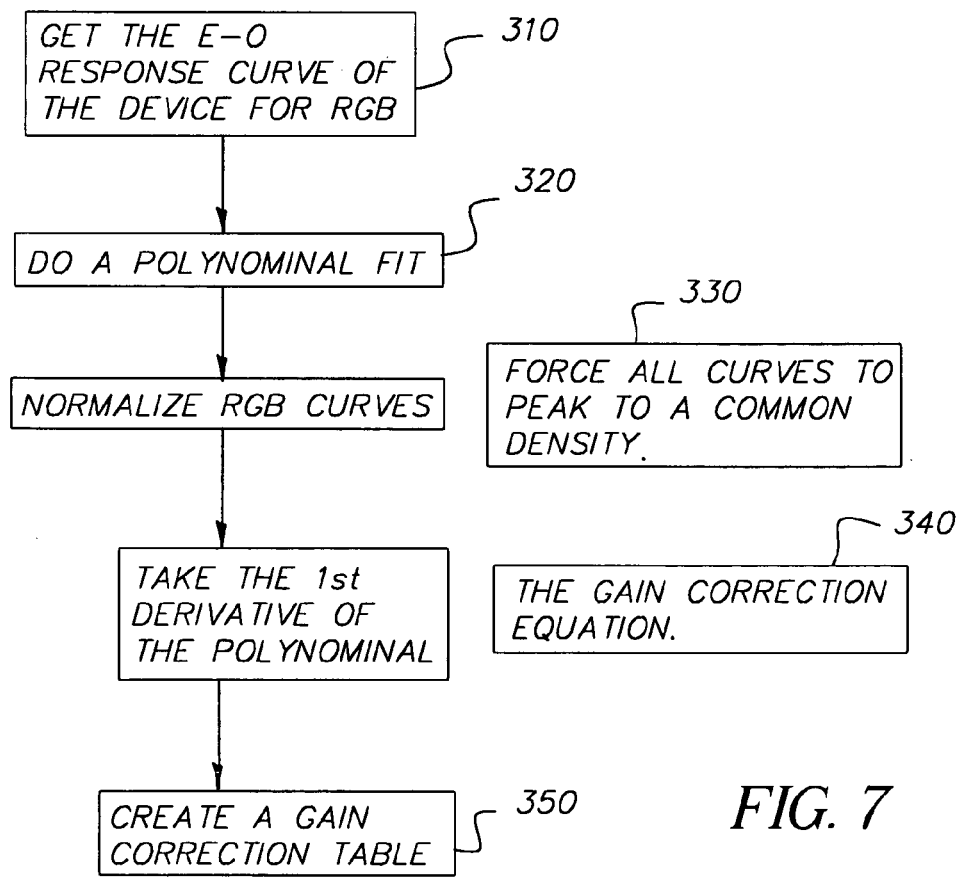
FIG. 7 is a flow diagram for a gain correction equation.
Figure 8:
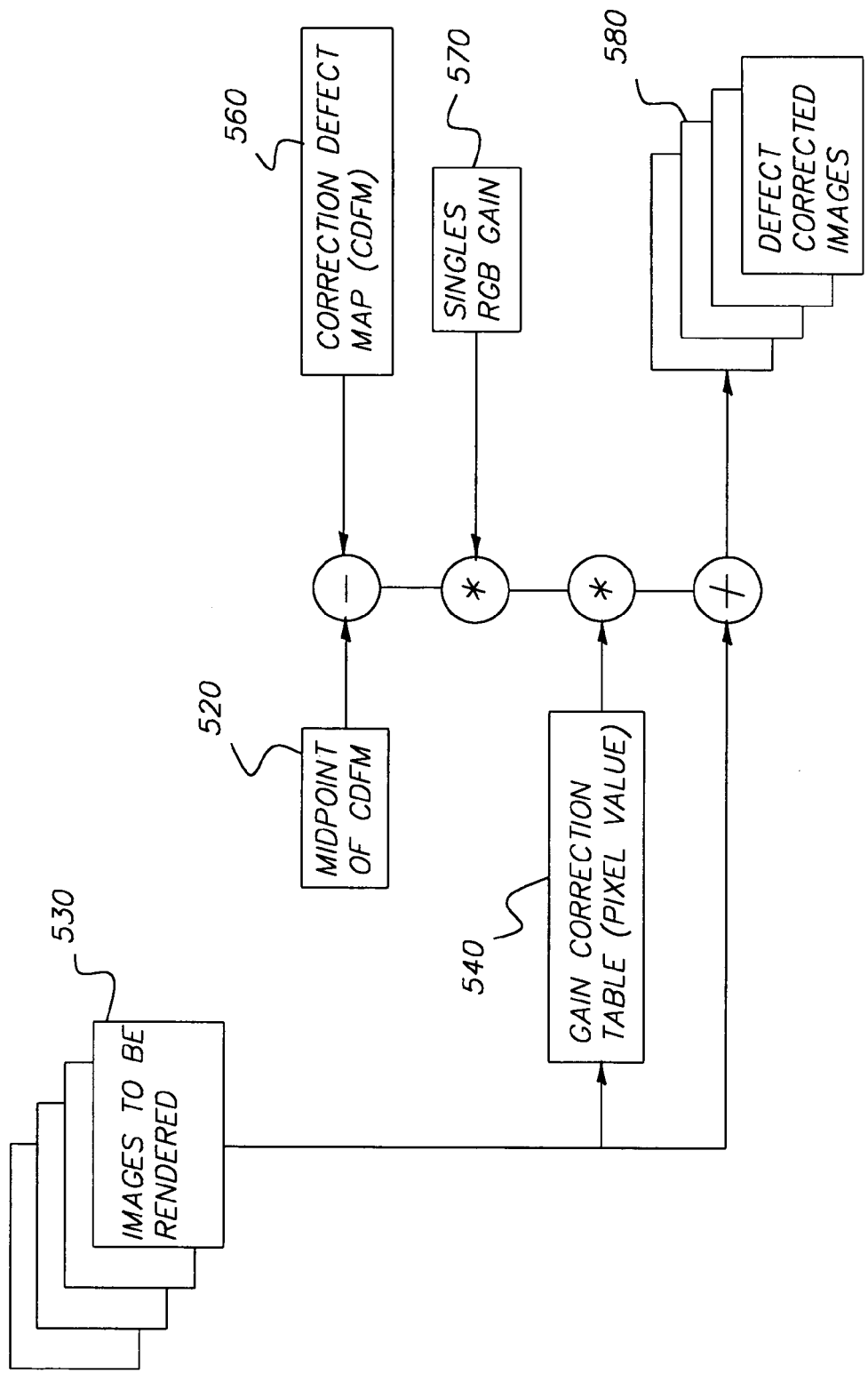
FIG. 8 is a schematic showing application of the correction defect map for a single RGB gain and a gain correction table.
Figure 9:
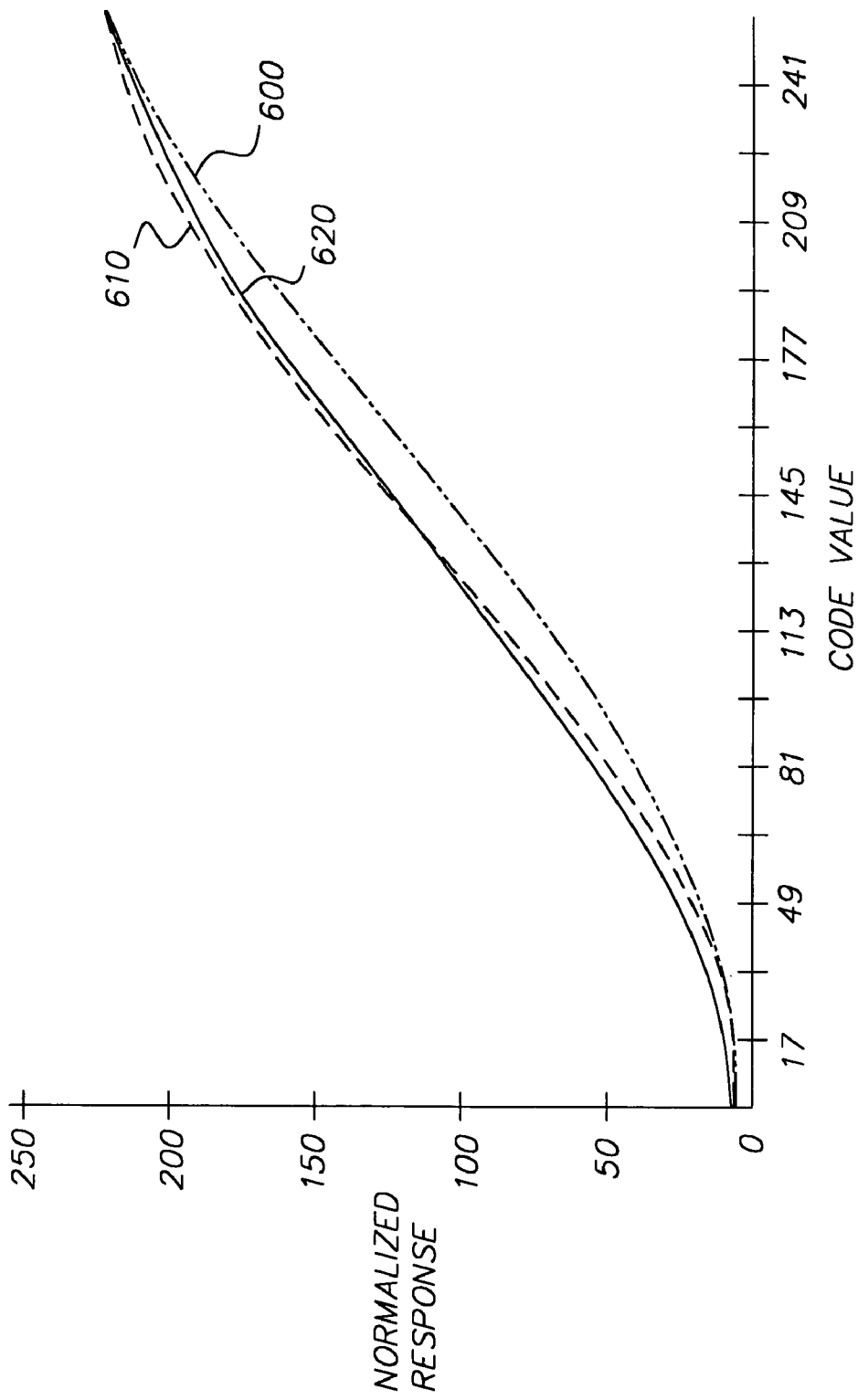
FIG. 9 is a graph of a polynomial representing a normalized response for a LCD.
Figure 10:
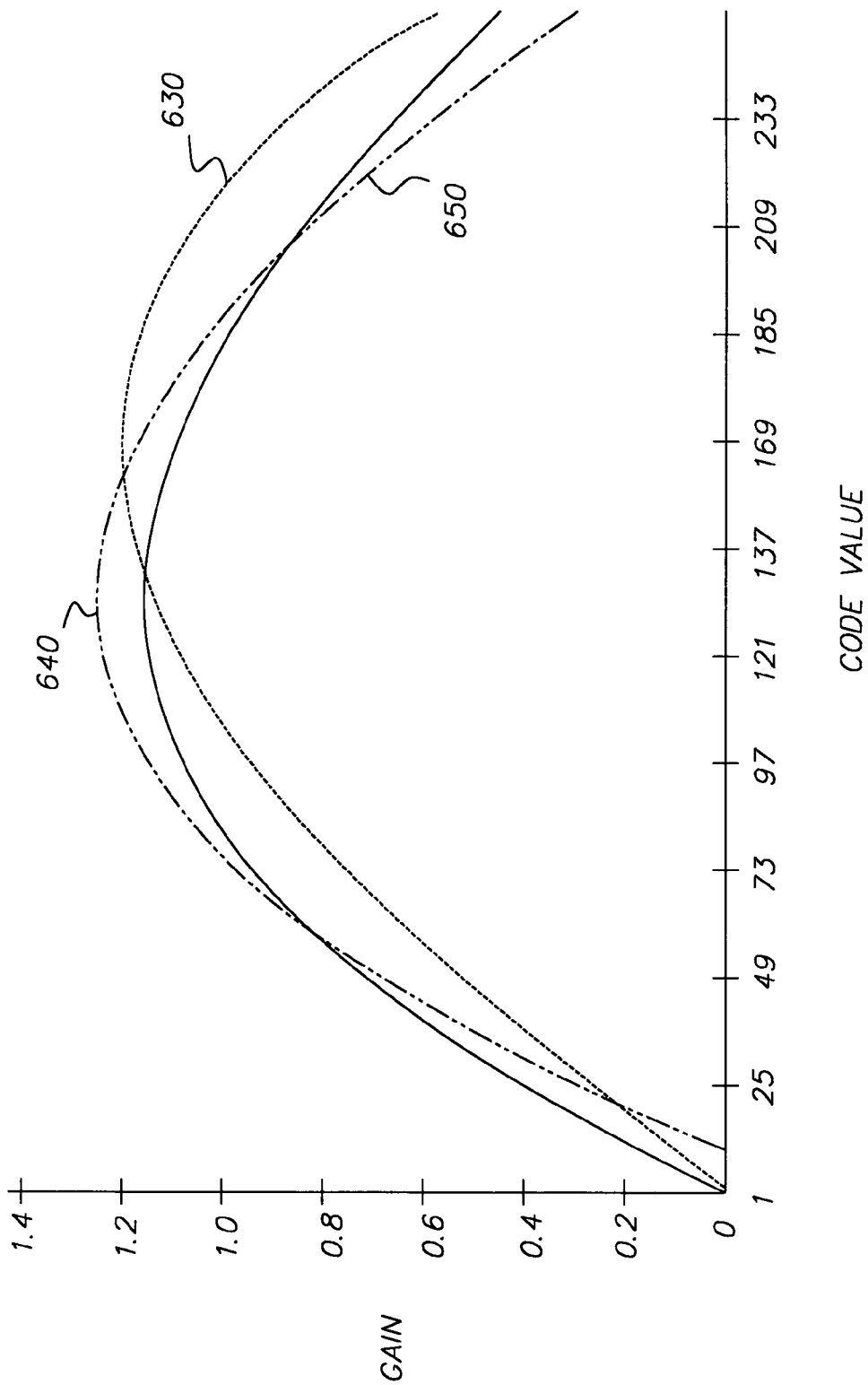
FIG. 10 shows gain correction curves derived from the response curve.

In an alternate embodiment, obtaining the response curves for the device accomplishes this. The flow chart for the second embodiment is shown in FIG. 7. The response curve 310, shown in FIG. 8, is determined by increasing the signal to the device in known steps (called code values) while monitoring the resulting light output. The corresponding light output of the device is measured producing a response curve though a polynomial or other functional fit 320. As shown in FIG. 9, this curve can be normalized 600, 610, 620 to represent the curve in relation to the density values on paper with the high end of the curve maximized at the highest possible density 330. The first derivative of the curves the gain correction curves shown in FIG. 10 are 630, 640, 650. In effect, gain values relate to any code value that the image may contain. This gain correction curve is transformed into a gain correction table 350 for purposes of math efficiency. A curve is produced for each color channel, so effectively there exists separate RGB gain correction tables. Correction is applied as in the previous embodiment.

In both embodiments a flow chart representing inclusion of the defect correction map and the gain table into printing system is shown in FIG. 8. The image to be rendered 530 includes the defect map, the defect map 560 includes a comparison to a midpoint value 520, a single gain from the flatfield correction 570, and a secondary gain table 540 which is based on the pixel value from the image being rendered. The difference between the midpoint value 520 and the pixel value from the defect map 560 becomes the correction amount for that pixel coordinate, however, the composite gains 570, 540 are applied to this difference prior to the amount being applied to the image being rendered. The result is a defect corrected image 580 the midpoint is derived from the peak value of the histogram of the defect map, or alternatively from the mean value of all the pixels of the defect map.

In another embodiment, the defect map generated at a single code value is not representative of the defects at another value. For such cases, multiple defect correction maps need to be generated. Defect correction maps corresponding to a high intensity/density, a mid intensity/density, and a low intensity/density may be required. The relative gain between mapped code values is generated as in the previous embodiments.

In a most complex embodiment, defect maps are created for every code value and stored. Relative gain may be applied between defect correction maps or may included in the acquisition method. The result is a three dimensional table that is dimensioned by the x direction resolution, y direction resolution, and the code value.

Because all data collection occurs at the image plane, and all correction is applied to input image data, the stated embodiments are a valid approach for non-uniformity correction with any spatial light modulator (SLM).

It should also be noted that the same method of correction can be applied to any printing system that contains an element with individual sites corresponding to image pixels. Such "pixilated devices" allow use of optical systems not only with spatial light modulators, but other arrays such as organic light emitting diode arrays, light emitting diode arrays, laser arrays, and CRTs. The algorithm is effectively hardware independent.

The reason that this method of defect corrections for non-uniformity is considered highly effective is because the gain correction table has to be formed only once for a given device. It is assumed that the response curve will not change to any significance for all devices manufactured within the same lot. In changing from one device to another the only algorithm values to be changed are the defect correction map and the singular gain value. Therefore, for any given device we only need to create a defect map and a singular gain value once the gain correction table has been created.

The same algorithm values may be allowed to account for media variations. The optical system and algorithm described relate to printers using a single pixilated element such as a spatial light modulator. If the same algorithm is applied to a system with multiple pixilated devices, defect correction maps and relative gain would have to be determined for each device. Image data to each device would be adjusted according to device specific defect correction maps. An example of such a system would be the three-channel spatial light modulator system with separate modulators for each color. The algorithm and method of application would not change.

In cases where there is mechanical manipulation of the optical components or the media, such as spatial dithering, the defect map is created at a single position if the motion is within a few pixels. This is because defects are usually spatially specific to devices. The gain however, is measured from the composite or final image to account for any variations due to media response or to the perception of data. However, when the motion is a larger distance, defect maps may be created for each position to account for variations in illumination optics.

The optical system described relates primarily to printing. However, the algorithm is independent of media. The defect correction map can be determined at the image plane with a CCD camera, and the gain can be determined from the response (Electro-optic or otherwise) of the pixilated device or modulator. The correction data is applied to the image data. In so doing, the algorithm can be implemented in a projection system.

The invention has been described in detail with particular reference to certain preferred embodiments thereof, but it will be understood that variations and modifications can be effected within the scope of the invention. For example, an LCD spatial light modulator has been discussed throughout the specifications, however, the invention applies to devices using CRTs, digital micromirror device (DMD), or other imaging devices. While printing systems have been described the invention is equally applicable to projections systems and any application which requires correction of image data.

PARTS LIST

10. Photographic printing system
12. LED
14. Collimating lens
30. Field lens
40. Linear polarizer
45. Uniformizing optics
50. Lenslet array
52. LCD
54. Liquid crystal material
56. LCD
60. Field lens
65. Intermediate conjugate plane
70. Condenser lens
75. Illumination optics
80. Polarizing beamsplitter
90. Reflective LCD modulator 92. Modulator sites
110. Print lens assembly
120. Linear polarizer
130. Image plane
140. Light sensitive media
150. Image plane
210. Flat bed reflection scanner
220. Unique geometric alignment issue
230. Image low-pass filtered
235. Histogram curves
240. Individual color channels (RGB)
250. Flatfield image
260. Scanned image
265. Defect map
270. Defect map printed
290. Defects not corrected
300. Defects corrected
305. Defect correction map
310. Response curve
320. Functional fit
340. Curve
350. Gain correction table
360. Flatfield image
370. Project image digitally
380. Digital image resized
390. Unique geometric alignment issue
400. Image high-pass filtered
460. Code value
470. Density range
480. Gain correction table
490. Increasing density
510. Gain incremented in predetermined steps
520. Midpoint value
530. Image rendered
540. Secondary gain table
560. Defect map
570. Flatfield correction
580. Defect corrected image
600. Curve normalized
610. Curve normalized
620. Curve normalized
630. Gain correction curves
640. Gain correction curves
650. Gain correction curves

What is claimed is:

1. A method for correcting defects in an imaging system comprising the steps of:
   transmitting a digital image to at least one spatial light modulator;
   capturing said resulting image;
   comparing variations in intensity between each image pixel and at least one reference image pixel;
   deriving a correction factor from said comparison;
   determining gain of correction at each code value for each image pixel; and
   applying said correction factor and gain to said digital image.

2. A method for correcting defects in an imaging system as in claim 1 wherein said resulting image is captured by a digital camera.

3. A method for correcting defects in an imaging system as in claim 1 wherein said spatial light modulator is a LCD.

4. A method for correcting defects in an imaging system as in claim 1 wherein said resulting image is captured by:
   printing said resulting image; and
   scanning said resulting image.

5. A method for correcting defects in an imaging system as in claim 1 wherein said transmitted digital image is a flatfield of single code value.

6. A method for correcting defects in an imaging system as in claim 1 wherein said gain is determined at specified code values.

7. A method for correcting defects in an imaging system as in claim 6 wherein said gain is determined by varying gain and visually selecting gain value.

8. A method for correcting defects in an imaging system as in claim 6 wherein said gain is determined by varying gain and measuring standard deviation.

9. A method for correcting defects in an imaging system as in claim 6 wherein said gain is determined by varying gain and measuring spatial frequency components.

10. A method for correcting defects in an imaging system as in claim 6 wherein said gain is determined for every code value.

11. A method for correcting defects in an imaging system as in claim 6 wherein said gain is determined at selected code values and best fit curve is determined.

12. A method for correcting defects in an imaging system as in claim 6 wherein said gain is constant for all code values.

13. A method for correcting defects in an imaging system as in claim 6 wherein said gain is linear as a function of code value.

14. A method for correcting defects in an imaging system as in claim 1 wherein said gain the first derivative of the response characteristic of the spatial light modulator.

15. A method for correcting defects as in claim 1 wherein defect maps are created at multiple code values.

16. A method for correcting defects in an imaging system as in claim 1 wherein multiple defect maps corresponding to multiple spatial light modulators are generated.

17. A method for correcting defects in an imaging system comprising the steps of:
   transmitting a digital image data to at least one pixilated device;
   displaying said resulting image;
   capturing said resulting image;
   comparing variations in intensity between each image pixel and at least one reference image pixel;
   deriving a correction factor from said comparison;
   determining gain of correction at each code value for each image pixel; and
   applying said correction factor and gain to said digital image.

18. A method for correcting defects in an imaging system as in claim 17 wherein said resulting image is captured by a digital camera.

19. A method for correcting defects in an imaging system as in claim 17 wherein said spatial light modulator is selected from a group comprising an organic Light Emitting Diode array, a Light Emitting Diode array, a laser array, and a CRT.

20. A method for correcting defects in an imaging system as in claim 17 wherein said resulting image is captured by:
   printing said resulting image; and
   scanning said resulting image.

21. A method for correcting defects in an imaging system as in claim 17 wherein said transmitted digital image is a flatfield of single code value.

22. A method for correcting defects in an imaging system as in claim 17 wherein said gain is determined at specified code values.

23. A method for correcting defects in an imaging system as in claim 16 wherein said gain is determined by varying gain and visually selecting gain value.

24. A method for correcting defects in an imaging system as in claim 16 wherein said gain is determined by varying gain and measuring standard deviation.

25. A method for correcting defects in an imaging system as in claim 16 wherein said gain is determined by varying gain and measuring spatial frequency components.

26. A method for correcting defects in an imaging system as in claim 16 wherein said gain is determined for every code value.

27. A method for correcting defects in an imaging system as in claim 16 wherein said gain is determined at selected code values and best fit curve is determined.

28. A method for correcting defects in an imaging system as in claim 16 wherein said gain is constant for all code values.

29. A method for correcting defects in an imaging system as in claim 16 wherein said gain is linear as a function of code value.

30. A method for correcting defects in an imaging system as in claim 17 wherein said gain the first derivative of the response characteristic of the pixilated device.

31. A method for correcting defects as in claim 1 wherein defect maps are created at multiple code values.

32. A method for correcting defects in an imaging system as in claim 1 wherein multiple defect maps corresponding to multiple pixilated devices are generated.

33. A method for correcting defects in a spatial light modulator printing system comprising the steps of:
   transmitting a digital image to a spatial light modulator based printing system;
   printing said digital image;
   scanning said printed image to produce a digital version of said printed image;
   comparing variations in intensity between each image pixel and a reference image pixel;
   deriving a correction factor from said comparison;
   deriving a gain;
   applying said correction factor and gain to said digital image; and
   printing said corrected digital image.

34. A method for correcting defects in an imaging system comprising the steps of:
   transmitting a digital image to at least one spatial light modulator;
   displaying said resulting image;
   comparing variations in intensity between each image pixel and at least one reference image pixel;
   deriving a correction factor from said comparison;
   determining gain of correction at each code value for each image pixel; and
   applying said correction factor and gain to said digital image.

* * * * *